United States Patent [19]

Han

[11] Patent Number: 5,631,998

[45] Date of Patent: May 20, 1997

[54] METHOD FOR RECORDING AND/OR REPRODUCING DATA USING A DIGITAL VIDEO TAPE

[75] Inventor: Taek-soo Han, Suwon, Rep. of Korea

[73] Assignee: Samsung Electronics Co., Ltd., Kyungki-Do, Rep. of Korea

[21] Appl. No.: 541,410

[22] Filed: Oct. 10, 1995

[30] Foreign Application Priority Data

Dec. 30, 1994 [KR] Rep. of Korea ............... 94-40131

[51] Int. Cl.⁶ ..................................... H04N 5/91
[52] U.S. Cl. ................. 386/68; 386/111; 386/124
[58] Field of Search ...................... 358/341, 343, 358/312, 335; 360/19.1, 10.1, 32, 48, 33.1; 386/6–8, 33, 40, 68, 96, 109, 111, 112, 124; H04N 9/79, 11/02, 5/91, 5/926, 5/917, 7/26, 7/52

[56] References Cited

U.S. PATENT DOCUMENTS

| | | | |
|---|---|---|---|
| 5,168,356 | 12/1992 | Acampora et al. | 348/409 |
| 5,223,987 | 6/1993 | Muller | 386/77 |
| 5,257,141 | 10/1993 | Matsumi et al. | 360/32 |
| 5,377,051 | 12/1994 | Lane et al. | 386/81 |
| 5,398,143 | 3/1995 | Strolle et al. | 360/48 |
| 5,434,677 | 7/1995 | Oikawa | 386/74 |
| 5,450,209 | 9/1995 | Niimura et al. | 386/11 |
| 5,461,486 | 10/1995 | Uchida | 358/409 |
| 5,486,931 | 1/1996 | Kim et al. | 386/73 |
| 5,510,899 | 4/1996 | Kim et al. | 386/69 |

OTHER PUBLICATIONS

Jim Boyce and Frank Lane, Fast Scan Technology For Digital VCR, IEEE, pp. 186–191 Oct. 1993.

*Primary Examiner*—Andrew Faile
*Assistant Examiner*—Vincent F. Boccio
*Attorney, Agent, or Firm*—Sughrue, Mion, Zinn, Macpeak & Seas

[57] ABSTRACT

A method for performing a trick play in a digital video tape apparatus for recording and/or reproducing an advanced television (ATV) signal is performed such that the data area of a sync block forming an audio sector and a video sector in a track is divided into a first area and a second area to record and reproduce normal-play data and trick-play data for a normal play and a trick play, respectively. The area corresponding to 5.6 Mbps is used for trick-play data in the case of an ATV signal; a separate data area for the error correction coding of a trick-play data is not necessary. Also, since trick plays of speeds of even-number times are available within the range of the maximum multiple speed, a diversity of speeds for a trick-play mode are allowed.

12 Claims, 8 Drawing Sheets

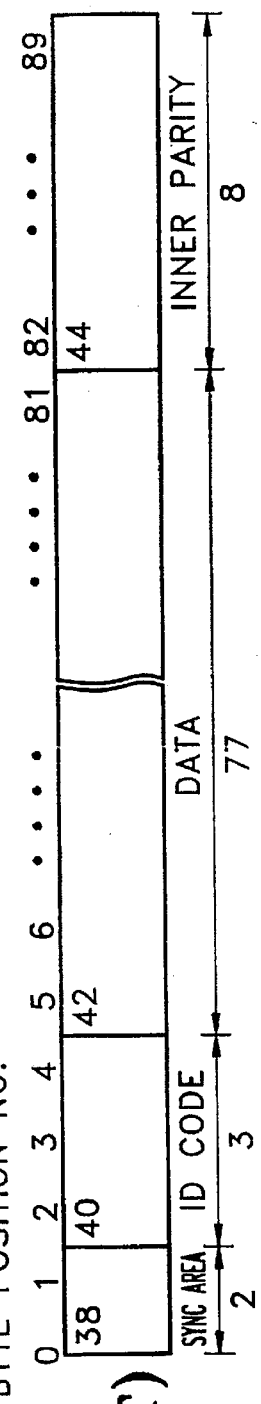
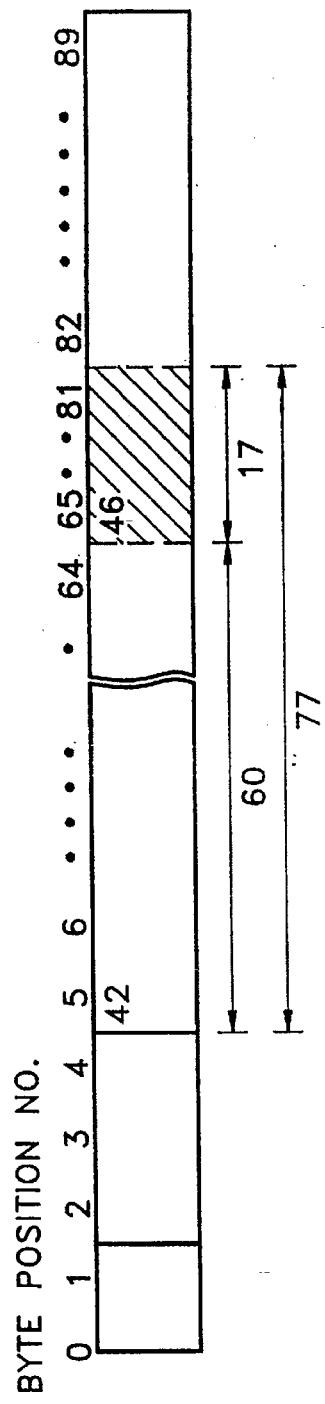
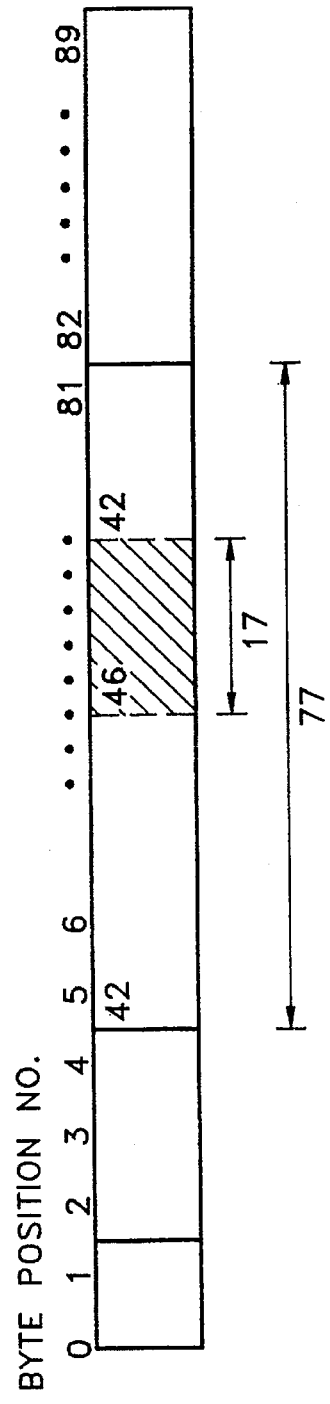
FIG. 2A (PRIOR ART)
FIG. 2B
FIG. 2C

☐ NORMAL DATA AREA  ▨ TRICK DATA AREA

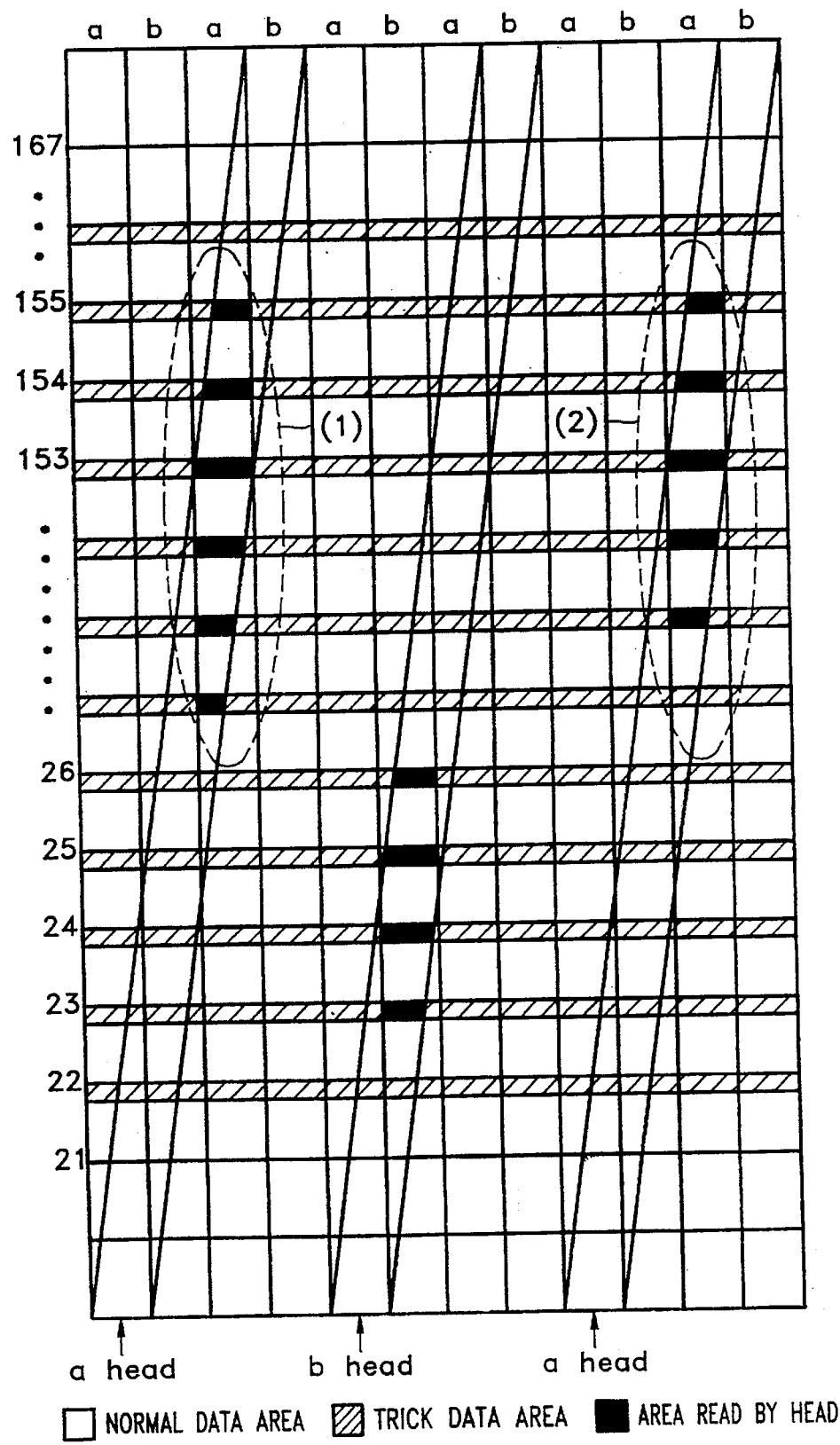

METHOD FOR RECORDING AND/OR REPRODUCING DATA USING A DIGITAL VIDEO TAPE

BACKGROUND OF THE INVENTION

The present invention relates to a method for recording and/or reproducing data using a digital video tape, and more particularly, to a method for recording and/or reproducing data for performing a trick-play in an apparatus for recording and reproducing an advanced television (ATV) signal using a digital video tape.

A digital video tape recorder (DVCR) for recording and reproducing an ATV signal on digital video tape of a standard-definition videocassette recorder (SD-VCR) has been developed. Here, considering that the bit stream for an SD-VCR has a bit rate of 24.9 Mbps and the bit stream for an ATV signal has a bit rate of 19.3 Mbps, an area where bits can be recorded at a rate of 5.6 Mbps remains unused. An ongoing study is directed to a method by which trick-play data for performing trick-play operations can be recorded in the above remaining video and audio sector areas in order to satisfy various trick-play speeds and meet the requirements of various kinds of scanners while improving picture quality by reducing noise.

As a part of this study, the present invention proposes a method for recording the trick-play data which enables a broader range of multiple speeds in a trick-play mode at the time of recording or reproducing data for a DVCR.

The goal in developing DVCRs is to establish a recording format for a specific reproduction which is desirable in terms of picture quality and cost.

A conventional method exists by which trick-play data is arranged in the scanning area corresponding to each multiple speed. According to this method, the picture quality of a screen reproduced by performing a trick-play operation is relatively good. However, it is essential to scan the trick-play data area in scanning areas corresponding to each multiple speed. Thus, the servo should be controlled with a high degree of precision, which results in a cost increase.

SUMMARY OF THE INVENTION

In order to solve the above-described problems, it is therefore an object of the present invention to provide a method for recording data onto or reproducing data from a digital video tape whereby the manufacturing cost is reduced and a diversity of multiple speeds are available in performing trick-play operations of a DVCR, since high-precision servo control is not required when a head scans a data-arranged area.

According to one aspect of the present invention, there is provided a method for recording data onto a digital video tape by dividing the ATV signal into normal-play data for performing a normal-play operation and trick-play data for performing a trick-play operation, wherein the ATV signal contains frame data which are supplied in a predetermined interval and can be decoded independently, the method comprising the steps of: dividing the data area of a sync block forming an audio sector and a video sector of each track of the digital video tape into a first area and a second area; recording the normal-play data in the first area and the trick-play data in the second area; and repeatedly recording the same trick-play data in sync blocks of the same number with respect to a number of tracks corresponding to twice the maximum even-multiple speed number among a plurality of even-multiple speeds, when the trick-play data is recorded in the second area.

According to another aspect of the present invention, there is provided a method for recording data onto a digital video tape by dividing the ATV signal into normal-play data for performing a normal-play operation and trick-play data for performing a trick-play operation, wherein the ATV signal contains frame data which are supplied in a predetermined interval and can be decoded independently, the method comprising the steps of: dividing the data area of a sync block forming a video sector of each track of the digital video tape into a first area and a second area; recording the normal-play data in the first area and the trick-play data in the second area; and repeatedly recording the same trick-play data in sync blocks of the same number with respect to a number of tracks corresponding to twice the maximum even-multiple speed number among a plurality of even-multiple speeds, when the trick-play data is recorded in the second area.

According to still another aspect of the present invention, there is provided a method for recording data onto a digital video tape by dividing the ATV signal into normal-play data for performing a normal-play operation and trick-play data for performing a trick-play operation, wherein the ATV signal contains frame data which are supplied in a predetermined interval and can be decoded independently, the method comprising the steps of: dividing the data area of a sync block forming an audio sector of each track of the digital video tape into a first area and a second area; recording the normal-play data in the first area and the trick-play data in the second area; and repeatedly recording the same trick-play data in sync blocks of the same number with respect to a number of tracks corresponding to twice the maximum even-multiple speed number among a plurality of even-multiple speeds, when the trick-play data is recorded in the second area.

According to still yet another aspect of the present invention, there is provided a method for reproducing an ATV signal containing frame data supplied in a predetermined interval and decoded independently by dividing said ATV signal into normal-play data for performing a normal-play operation and trick-play data for performing a trick-play operation and recording said normal-play data and trick-play data respectively in first and second areas of each track of a digital video tape, said method comprising the steps of: scanning the data-recorded area of said digital video tape by means of a head; decoding said trick-play data by scanning said first area in which normal-play data is recorded and said second area in which trick-play data is recorded and by scanning an inner parity error correction area; and reproducing said trick-play data by decoding said trick-play data by scanning an outer parity error correction area for said second area.

BRIEF DESCRIPTION OF THE DRAWINGS

The above objects and advantages of the present invention will become more apparent by describing in detail a preferred embodiment thereof with reference to the attached drawings in which:

FIGS. 2A to 2C show data sync blocks according to the conventional method and the present invention;

FIGS. 4A to 4D show trick-play performance according to the present invention.

DETAILED DESCRIPTION OF THE INVENTION

In the present invention, normal-play data and trick-play data are recorded separately in different areas in a data area of a sync block, which can be attained by employing as a trick-play data area the 5.6 Mbps bit stream which remains when a 19.3 Mbps ATV bit stream is used as a normal-play data area in the recording bit capacity of a 24.9 Mbps SD-VCR bit stream.

Figure 1:
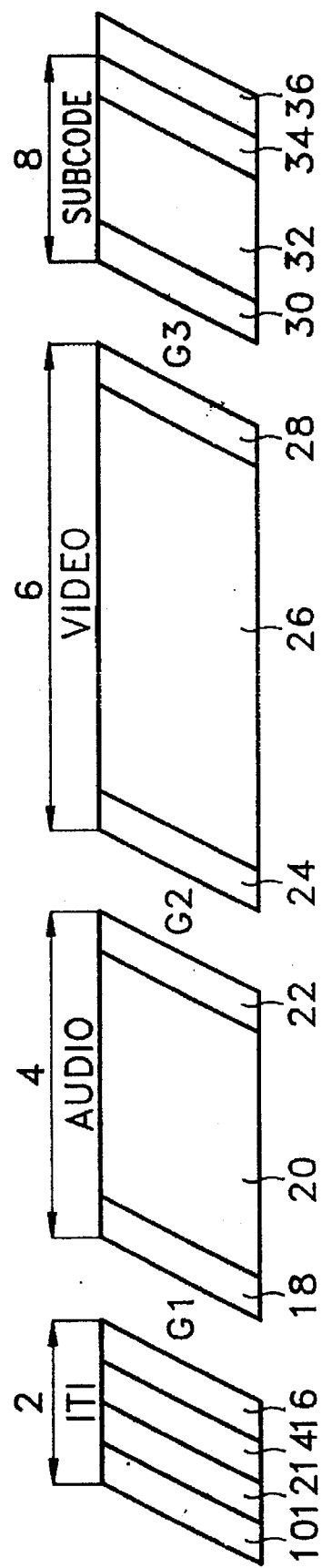
FIG. 1 shows a track format of a digital video tape having a recording format of an SD-VCR.

In FIG. 1, a track is sequentially divided into an insert and track information (ITI) sector 2, an audio sector 4, a video sector 6 and a subcode sector 8.ABpg G1, G2 and G3 exist between the respective sectors. ITI sector 2 consists of ITI pre-amble 10, start-sync block area 12, track information area 14 and ITI post-amble 16. Audio sector 4 consists of audio pre-amble 18, fourteen audio data sync blocks 20 and audio post-amble 22. Video sector 6 consists of video pre-amble 24, 149 video data sync blocks 26 and video post-amble 28. Subcode sector 8 consists of subcode pre-amble 30, subcode area 32 and subcode post-amble 34. The area following the subcode sector 8 corresponds to an overwrite margin 36.

FIG. 2A shows a conventional data sync block. In FIG. 2A, reference numeral 38 denotes a two-byte sync area, 40 denotes a three-byte identification (ID) code, 42 denotes a 77-byte data area, and 44 denotes an eight-byte inner parity area.

FIG. 2B shows a data sync block according to the present invention. In FIG. 2B, reference numeral 42 denotes a data area (the same as shown in FIG. 2A), and 46 denotes an area for recording trick-play data having a predetermined size within the data area 42. Though the trick-play data area 46 is shown to occupy seventeen bytes from the 65th byte to the 81st byte within the data area 42 in FIG. 2B, it is not necessarily limited to positions of these bytes and may occupy any seventeen bytes positioned within the data area 42. Also, the seventeen bytes allotted herein is merely an example, and the number of the bytes of trick-play data area 46 can vary according to the surplus C Mbps bit stream which is obtained by subtracting a B Mbps ATV signal bit stream from an A Mbps SD-VCR bit stream; that is, A−B=C. Here, A and B are real numbers. Currently, since the bit rate of the standardized SD-VCR bit stream is 24.9 Mbps and that of the standardized ATV signal bit stream is 19.3 Mbps, the 5.6 Mbps surplus is used for the trick-play data area. That is to say, if the value of A and/or B is changed, C is also changed accordingly.

FIG. 2C shows that the trick-play data of the data area is set in a different position from that of FIG. 2B and indicates that the trick-play data can be recorded in any position of the data area 42. Positioning the trick-play data as in FIG. 2C is applicable to both audio and video sectors. However, for the sake of a simplified explanation, only the video sector application will be described. Here, the reference numerals in FIG. 2C are the same as those in FIG. 2B.

The present invention shows an embodiment for the case when the trick-play data is recorded in the last seventeen bytes of data area 42, as shown in FIG. 2B, which is applied to an audio sector as well as a video sector.

Figure 3A:
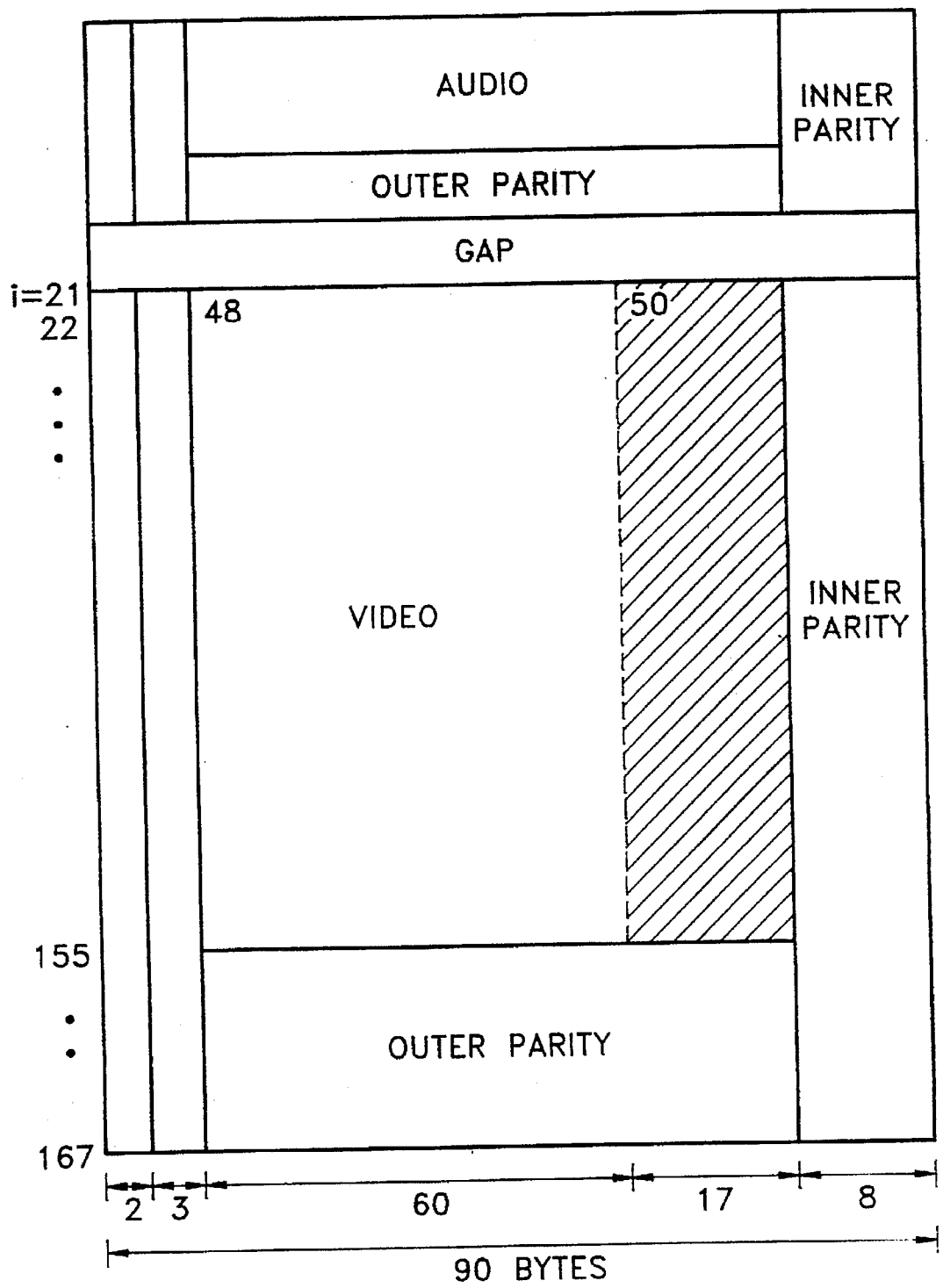
FIGS. 3A and 3B show audio and video sectors of a sync block of data area according to the present invention.

FIG. 3A shows a video sector of each sync block and corresponds to the case when the trick-play data is positioned as shown in FIG. 2B. In FIG. 3A, reference letter i denotes the number of sync blocks with respect to video data, 48 denotes an area where normal-play data is recorded within the data area, and 50 denotes an area where trick-play data is recorded within the data area.

Figure 3B:
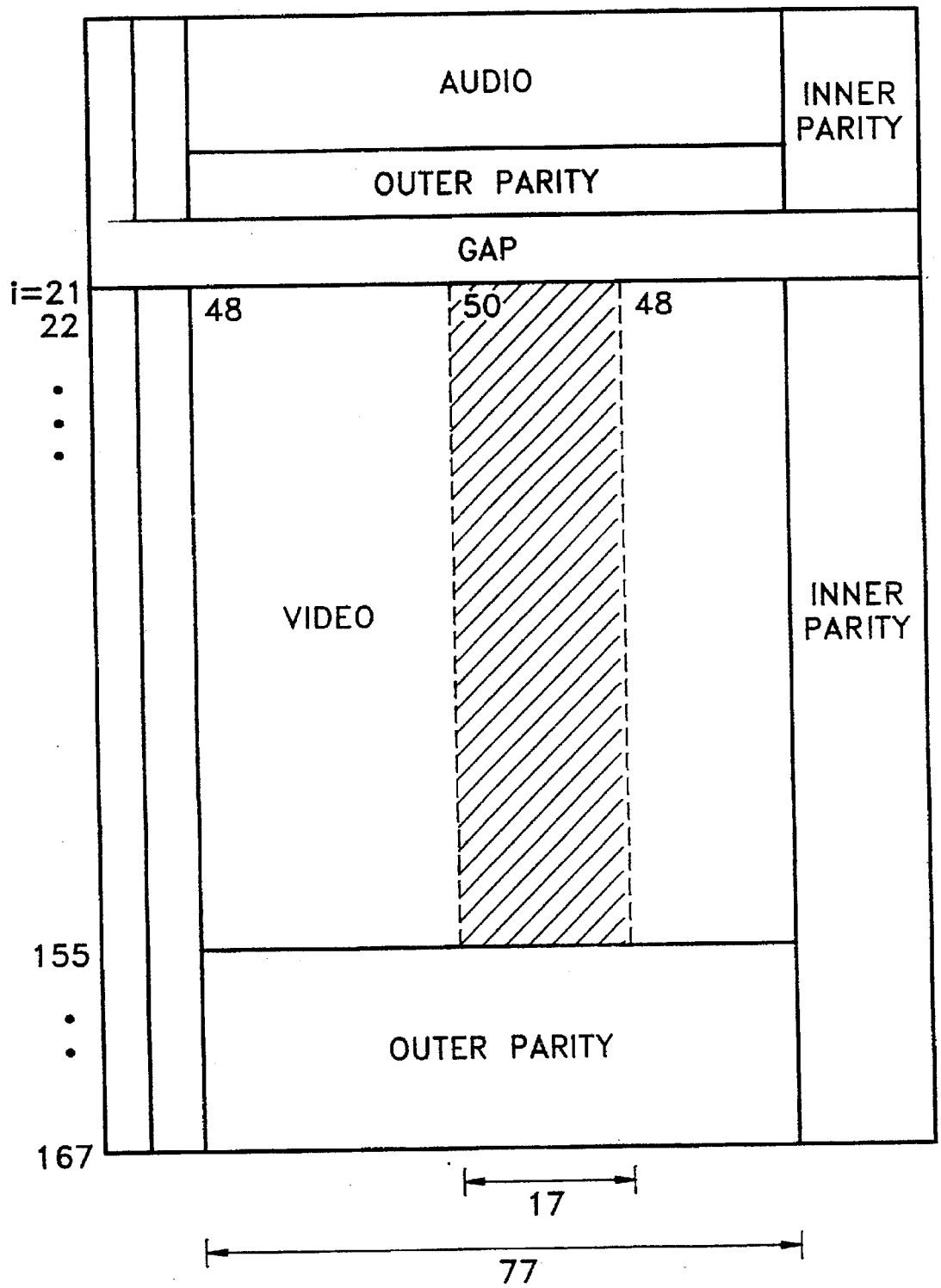

FIG. 3B shows a video sector of each sync block of a data area and corresponds to the case when the trick-play data is positioned as shown in FIG. 2C. Reference numerals in FIG. 3B are the same as those in FIG. 3A and their explanation will be omitted.

In the present invention, for performing a trick-play operation, trick-play data is repeatedly recorded on as many tracks as twice the maximum multiple speed, and then reproduced.

Next, the effect of repeatedly recording trick-play data on as many tracks as twice the maximum multiple speed will be described with reference to FIGS. 4A to 4D.

Figure 4A:
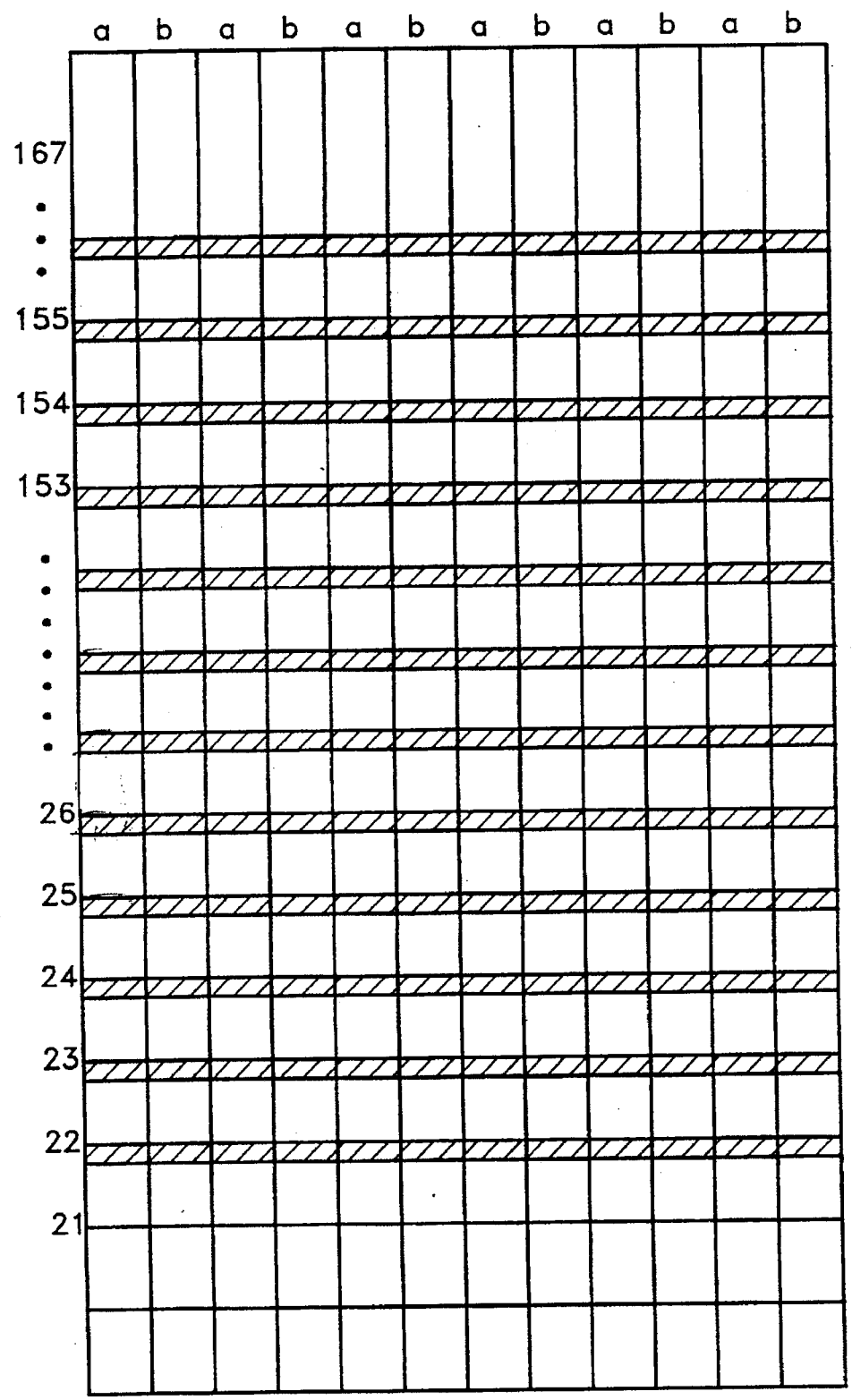

FIG. 4A shows a status where trick-play data is recorded on as many tracks as twice the maximum multiple speed and corresponds to the case shown in FIG. 3A. In FIG. 4A, numerals marked in the ordinate direction represent the number of sync blocks. Although the trick-play data is recorded only in the video data area here, it should be noted that the same effect is applied to the case when the trick-play data is recorded in the audio data area. If the case shown in FIG. 3B is applied to FIG. 4A, the trick-play data of each sync block will be repeatedly recorded somewhere in the mid-section of the sync block, not in the tail end.

Now, an embodiment of the present invention will be described in more detail.

In this embodiment, it is assumed that the maximum multiple speed is set as a speed of six times the normal-play speed.

Figure 4B:
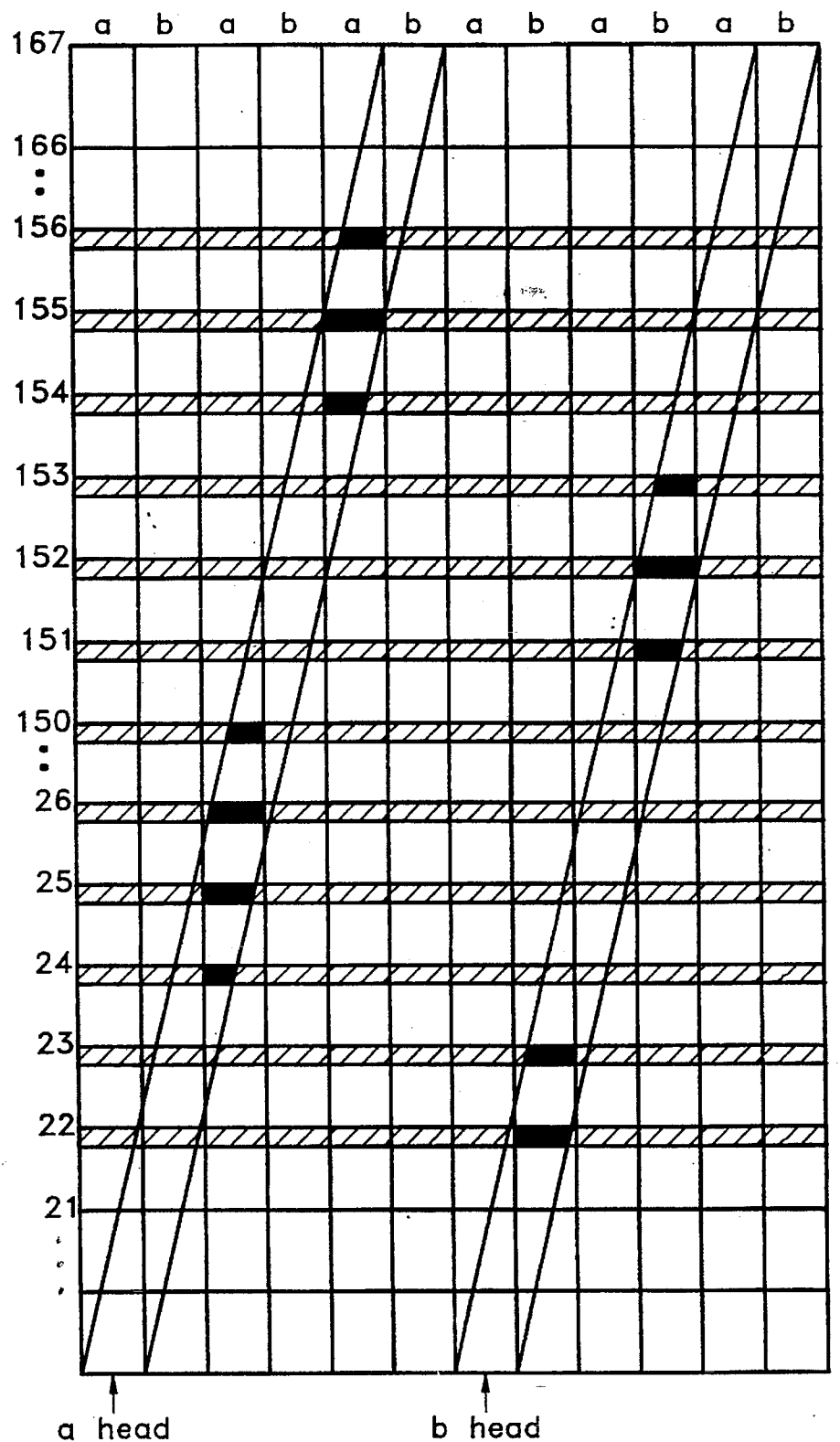

FIG. 4B shows that a head scans the track whereon trick-play data is recorded at a speed of six times the normal-play speed. In FIG. 4B, since the maximum multiple speed is six times the normal-play speed, the number of tracks having trick-play data recorded is twelve. The same trick-play data is recorded in each trick-play data area of the same sync block number with respect to twelve tracks. Here, the oblique-lined portions are trick-play data areas, the blackened portions are portions read by heads a and b during their scanning operations for a trick-play operation, and the "white" (blank) portions are normal-play data areas. Head a reads tracks of the a portion, and head b reads tracks of the b portion. Also, assuming that the recorded data can be decoded when more than 50% of the trick-play data is scanned, head a decodes sync blocks 23, 24, 25, 26, 153, 154 and 155 and head b decodes sync blocks 21, 22, 150, 151 and 152. That is to say, in the case of a maximum multiple speed of six-times the normal-play speed, the trick-play data is allotted to twelve tracks, to then be scanned by heads a and b.

According to the present invention, only even-numbered multiple speeds (i.e., 2x, 4x, 6x. . . ) are available, in view of the trick-play data arrangement. Thus, if the maximum multiple speed corresponds to 2N speeds, then, speeds of −2N, −2(N−1), −4, −2, 2, 4, . . . , 2(N−1) and 2N times are all available in the present invention. (Here, N is an integer.) Also, based on the respective multiple speeds, the multiple speeds which are obtained by adding −0.5, −0.4, −0.3, −0.2, −0.1, 0.1, 0.2, 0.3, 0.4 and 0.5 to the above respective multiple speeds are available. The reason is that the difference between the portions scanned by a head for performing a trick-play operation at a speed of 4.0 times and at a speed of 4.1 times is very small in lo the case of a speed of four times the normal-play speed, for example. Also, as described above, if the head reads 50% of the data, the data can be decoded. Thus, the multiple speeds corresponding to the numbers containing a decimal point at which more than 50% of data cannot be read, are not available. Next, according to the embodiment described above, the multiple speeds of four times and two times will be described.

FIG. 4C shows a scanning of a head when a speed of four times is selected, in the case of a trick-play operation which can be performed at a speed of six times the scanning speed at maximum. Since the same trick-play data is recorded in each trick-play data area of the same sync block number with respect to twelve tracks, head a scans the same data (the dotted-line portions 1 and 2) twice, and head b scans data once.

Figure 4D:
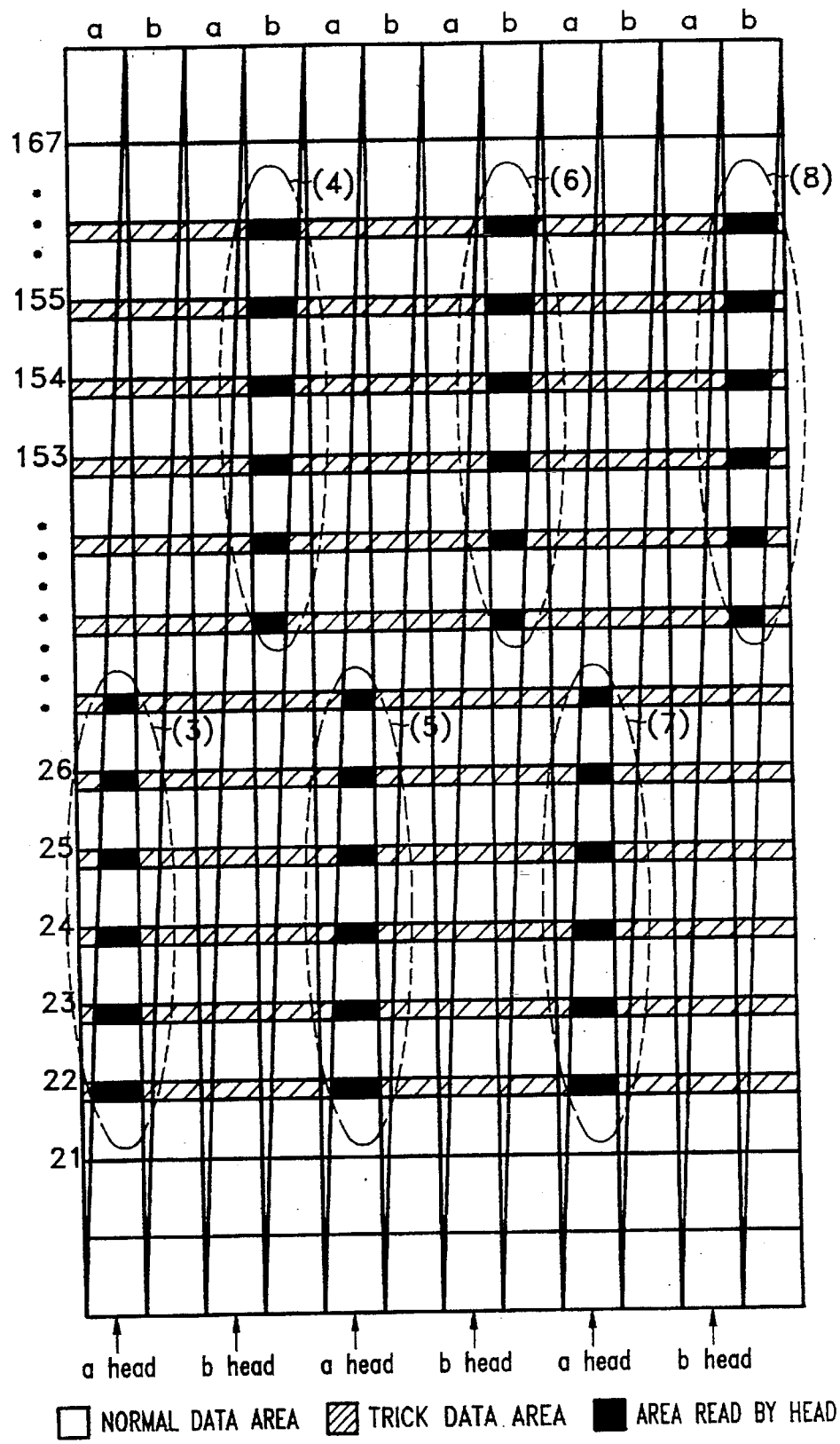

FIG. 4D shows a scanning of a head when a two-times speed is selected in the case of a trick-play operation by which the maximum speed of six times can be performed. Here, the same data is read three times each, by heads a and b, respectively. That is to say, portions 3, 5 and 7 represent the trick-play data read by head a and portions 4, 6 and 8 represent the trick-play data read by head b. Since the same screens are repeatedly displayed three times by the multiple speed of two times, compared to the multiple speed of six times, it appears comparatively tedious.

If the trick-play data is recorded at a speed of 30 times at the maximum, based on the principle of the present invention, trick-play operations at speeds of 2, 4, 6, . . . , 28 and 30 times are available. In addition to these forward multiple speeds, the reverse-direction multiple speeds corresponding thereto are also available. Also, based on the respective multiple speeds, the multiple speeds corresponding to the numbers having a decimal point are available as above-explained. This means that the user's selection becomes remarkably diversified, compared to those in the conventional trick-play system which enables only speeds of a specific multiple.

Next, the operation of error correction coding (ECC) will be described.

For a sync block, error correction codes follow behind audio and video data areas. As shown in FIGS. 3A and 3B, inner parity is disposed vertically and outer parity is disposed horizontally, both of which perform an ECC.

In the present invention, an eight-byte inner parity follows a 77-byte data area for a sync block. Also, for a track, the outer parities follow the audio data area in the sync blocks of a predetermined number, and the outer parities of a predetermined number follow the video data area, for performing an ECC.

Conventionally, there has been a method by which the original ECC area and a predetermined data area are required for performing the ECC of the trick-play data. However, according to the present invention, since the trick-play data is recorded in seventeen bytes of audio and video data areas, a separate area for performing the ECC of trick-play data is not necessary. The ECC of normal-play data and trick-play data can be performed using only the area necessary for the ECC of the normal-play data.

Therefore, the ECC of the trick-play data can be implemented with the ECC area of normal-play data only, which is an essential area. This contributes to a recording efficiency whereby a large quantity of data can be recorded in a given area.

As described above, according to the present invention, the area corresponding to 5.6 Mbps is used as trick-play data in the case of an ATV signal. Also, a separate data area is not required for performing ECC of trick-play data. Since the trick-play operation of speeds of even-number multiples are available within the range of the maximum multiple speed, a variety of speeds for a trick-play mode is allowed.

What is claimed is:

1. A method for recording data onto a digital video tape by dividing an ATV signal into normal-play data for performing a normal-play operation and trick-play data for performing a trick-play operation, wherein said ATV signal contains frame data which are supplied in a predetermined interval and can be decoded independently, said method comprising the steps of:

dividing the data area of a sync block forming an audio sector and a video sector of each track of said digital video tape into a first area and a second area;

recording said normal-play data in said first area and said trick-play data in said second area; and repeatedly recording identical trick-play data in sync blocks of a number of tracks, said number of tracks corresponding to twice a maximum even-multiple speed number among a plurality of even-multiple speeds, when said trick-play data is recorded in said second area.

2. A method for recording data onto a digital video tape as claimed in claim 1, wherein said trick-play has a recording bit capacity corresponding to the difference between SD-VCR and ATV signal recording bit capacities with respect to a recording bit capacity of the data area of each sync block, and is recorded in said second area to perform said trick-play operation.

3. A method for recording data onto a digital video tape as claimed in claim 1, wherein said trick-play data has a recording bit capacity corresponding to the difference between SD-VCR and ATV signal recording bit capacities with respect to the recording bit capacity of the data area of each sync block, is recorded periodically and repeatedly at an identical interval in each track.

4. A method for recording data onto a digital video tape by dividing an ATV signal into normal-play data for performing a normal-play operation and trick-play data for performing a trick-play operation, wherein said ATV signal contains frame data which are supplied at a predetermined interval and can be decoded independently, said method comprising the steps of:

dividing the data area of a sync block forming a video sector of each track of said digital video tape into a first area and a second area;

recording said normal-play data in said first area and said trick-play data in said second area; and repeatedly recording identical trick-play data in sync blocks of a number of tracks, said number of tracks corresponding to twice a maximum even-multiple speed number among a plurality of even-multiple speeds, when said trick-play data is recorded in said second area.

5. A method for recording data onto a digital video tape as claimed in claim 4, wherein said trick-play data has a recording bit capacity corresponding to the difference between SD-VCR and ATV signal recording bit capacities with respect to a recording bit capacity of the data area of each sync block and is recorded in said second area to perform said trick-play operation.

6. A method for recording data onto a digital video tape as claimed in claim 4, wherein said trick-play data has a recording bit capacity corresponding to the difference between SD-VCR and ATV signal recording bit capacities with respect to a recording bit capacity of the data area of each sync block and is recorded periodically and repeatedly at an identical interval in each track.

7. A recording method for recording data onto a digital video tape by dividing an ATV signal into normal-play data for performing a normal-play operation and trick-play data for performing a trick-play operation, wherein said ATV signal contains frame data which are supplied at a predetermined interval and can be decoded independently, said method comprising the steps of:

dividing the data area of a sync block forming an audio sector of each track of said digital video tape into a first area and a second area;

recording said normal-play data in said finest area and said trick-play data in said second area; and repeatedly recording identical trick-play data in sync blocks of a number of tracks, said number of tracks corresponding to twice a maximum even-multiple speed number among a plurality of even-multiple speeds, when said trick-play data is recorded in said second area.

8. A digital video tape recording method as claimed in claim 7, wherein said trick-play data has a recording bit capacity corresponding to the difference between SD-VCR and ATV signal recording bit capacities with respect to a recording bit capacity of the data area of each sync block and is recorded in said second area for performing said trick-play operation.

9. A digital video tape recording method as claimed in claim 7, wherein said trick-play data has a recording bit capacity corresponding to the difference between SD-VCR and ATV signal recording bit capacities with respect to a recording bit capacity of the data area of each sync block and is recorded periodically and repeatedly at an identical interval in each track.

10. A method for reproducing an ATV signal containing frame data supplied at a predetermined interval and decoded independently, said ATV signal being divided into normal-play data for performing a normal-play operation and trick-play data for performing a trick-play operation and said normal-play data and trick-play data being respectively recorded in first and second areas of each track of a digital video tape, said method comprising the steps of:

scanning the data-recorded area of said digital video tape by means of a head;

decoding said trick-play data by scanning said first area in which normal-play data is recorded and said second area in which trick-play data is recorded, said second area including sync blocks of a number of tracks where identical trick-play data is recorded, said number of tracks corresponding to twice a maximum playback speed, and by scanning an inner parity error correction area; and reproducing said trick-play data by decoding said trick-play data by scanning an outer parity error correction area of said second area.

11. A method for reproducing data from a digital video tape as claimed in claim 10, wherein said trick-play data is recorded in a recording area of 5.6 Mbps which occupies seventeen bytes in a 77-byte data area in a sync block and corresponds to the difference between the bit rates of SD-VCR and ATV signals and is reproduced for performing trick-play operation.

12. A method for reproducing data from a digital video tape as claimed in claim 10, wherein the trick-play data reproducing step includes scanning an inner parity error correction area recorded in an eight-byte recording capacity behind an area in which normal-play data and trick-play data are recorded in each sync block, and performing an error correction by allotting an outer parity error correction area in eleven sync blocks.

* * * * *